United States Patent
Cowan

(10) Patent No.: US 11,308,496 B2
(45) Date of Patent: Apr. 19, 2022

(54) METHOD, MEDIUM, AND SYSTEM FOR FRAUD PREVENTION BASED ON USER ACTIVITY DATA

(71) Applicant: GOOGLE LLC, Mountain View, CA (US)

(72) Inventor: Mathew Cowan, New York, NY (US)

(73) Assignee: GOOGLE LLC, Mountain View, CA (US)

(*) Notice: Subject to any disclaimer, the term of this patent is extended or adjusted under 35 U.S.C. 154(b) by 862 days.

(21) Appl. No.: 16/156,799

(22) Filed: Oct. 10, 2018

(65) Prior Publication Data

US 2019/0043056 A1 Feb. 7, 2019

Related U.S. Application Data

(63) Continuation of application No. 15/675,492, filed on Aug. 11, 2017, now Pat. No. 10,134,041, which is a (Continued)

(51) Int. Cl.
*G06Q 20/40* (2012.01)
*G06Q 20/12* (2012.01)
*G06Q 20/20* (2012.01)

(52) U.S. Cl.
CPC ......... *G06Q 20/4016* (2013.01); *G06Q 20/12* (2013.01); *G06Q 20/20* (2013.01)

(58) Field of Classification Search
CPC .... G06Q 20/4016; G06Q 20/12; G06Q 20/20; G06Q 10/0635; G06Q 30/0185; G06Q 30/0601–0643
See application file for complete search history.

(56) References Cited

U.S. PATENT DOCUMENTS

| | | | |
|---|---|---|---|
| 5,734,890 A | 3/1998 | Case et al. |
| 6,141,653 A | 10/2000 | Conklin et al. |

(Continued)

FOREIGN PATENT DOCUMENTS

| | | | |
|---|---|---|---|
| JP | 08-129590 A | 5/1996 |
| JP | 2002-342611 A | 11/2002 |

(Continued)

OTHER PUBLICATIONS

Bhatla, Tej Paul, Vikram Prabhu, and Amit Dua. "Understanding credit card frauds." Cards business review 1.6 (2003): 1-15. (Year: 2003).*

(Continued)

*Primary Examiner* — Matthew E Zimmerman
(74) *Attorney, Agent, or Firm* — Dority & Manning, P.A.

(57) ABSTRACT

A user conducts activities, such as researching a product online or visiting a store that sells the product. A user then utilizes a risk analysis system to receive and store user activity data for the user's activities. When a purchase attempt is made with the user's financial account, a merchant sends a transaction request to the risk analysis system. The risk analysis system locates a record for the user and determines whether the product is identified in the user activity data. If the product is identified, the risk analysis system provides a risk score to the merchant indicating that the transaction is unlikely fraudulent. Alternatively, identification of the product provides a positive factor among multiple factors considered in a transaction risk analysis. An absence of the product in the activity can be used as a neutral or negative factor among multiple factors considered in a risk analysis of the transaction.

20 Claims, 4 Drawing Sheets

Related U.S. Application Data continuation of application No. 13/935,400, filed on Jul. 3, 2013, now Pat. No. 9,811,830.

(56) References Cited

U.S. PATENT DOCUMENTS

| | | | |
|---|---|---|---|
| 6,199,102 B1 | 3/2001 | Cobb | |
| 6,260,024 B1 | 7/2001 | Shkedy | |
| 6,263,317 B1 | 7/2001 | Sharp et al. | |
| 6,405,159 B2 | 6/2002 | Bushey et al. | |
| 6,546,416 B1 | 4/2003 | Kirsch | |
| 6,658,394 B1 | 12/2003 | Khaishgi et al. | |
| 6,662,192 B1 | 12/2003 | Rebane | |
| 6,754,636 B1 | 6/2004 | Walker et al. | |
| 7,143,089 B2 | 11/2006 | Petras et al. | |
| 7,181,761 B2 | 2/2007 | Davis et al. | |
| 7,249,175 B1 | 7/2007 | Donaldson | |
| 7,263,506 B2 * | 8/2007 | Lee | G06Q 20/04 705/318 |
| 7,272,853 B2 | 9/2007 | Goodman et al. | |
| 7,296,053 B2 | 11/2007 | Abdulhayoglu | |
| 7,302,429 B1 | 11/2007 | Wanker | |
| 7,389,913 B2 | 6/2008 | Starrs | |
| 7,403,922 B1 | 7/2008 | Lewis et al. | |
| 7,409,258 B2 | 8/2008 | Huang et al. | |
| 7,464,264 B2 | 12/2008 | Goodman et al. | |
| 7,527,195 B2 * | 5/2009 | Keithley | G06Q 20/40 235/380 |
| 7,548,956 B1 | 6/2009 | Aoki et al. | |
| 7,552,186 B2 | 6/2009 | Werner et al. | |
| 7,644,019 B2 | 1/2010 | Woda et al. | |
| 7,665,131 B2 | 2/2010 | Goodman et al. | |
| 7,668,769 B2 | 2/2010 | Baker et al. | |
| 7,742,947 B2 | 6/2010 | Fu et al. | |
| 7,778,864 B2 | 8/2010 | Conrad et al. | |
| 7,778,878 B2 | 8/2010 | Harding et al. | |
| 7,778,884 B2 | 8/2010 | Bamborough et al. | |
| 7,792,704 B2 | 9/2010 | Harding et al. | |
| 7,853,480 B2 | 12/2010 | Taylor et al. | |
| 7,899,701 B1 | 3/2011 | Odom | |
| 7,959,074 B1 | 6/2011 | Chopra et al. | |
| 8,001,058 B1 | 8/2011 | Harding et al. | |
| 8,046,832 B2 | 10/2011 | Goodman et al. | |
| 8,065,370 B2 | 11/2011 | Hulten et al. | |
| 8,176,057 B2 | 5/2012 | Kim et al. | |
| 8,204,799 B1 | 6/2012 | Murray et al. | |
| 8,359,632 B2 | 1/2013 | Guo et al. | |
| 8,396,935 B1 | 3/2013 | Ciurumelea et al. | |
| 8,407,110 B1 | 3/2013 | Joseph et al. | |
| 8,515,791 B2 | 8/2013 | Woda et al. | |
| 8,549,611 B2 | 10/2013 | Judge et al. | |
| 8,572,391 B2 * | 10/2013 | Golan | G06F 21/40 713/183 |
| 8,700,487 B2 | 4/2014 | Grass et al. | |
| 8,725,597 B2 | 5/2014 | Mauseth et al. | |
| 9,811,830 B2 | 11/2017 | Cowan | |
| 2001/0054008 A1 | 12/2001 | Miller et al. | |
| 2002/0083020 A1 | 6/2002 | Leon | |
| 2002/0099649 A1 | 7/2002 | Lee et al. | |
| 2002/0120559 A1 | 8/2002 | O'Mara et al. | |
| 2002/0147622 A1 | 10/2002 | Drolet et al. | |
| 2002/0178074 A1 | 11/2002 | Bloom | |
| 2002/0194119 A1 | 12/2002 | Wright et al. | |
| 2003/0009698 A1 | 1/2003 | Lindeman et al. | |
| 2003/0023499 A1 | 1/2003 | Das et al. | |
| 2003/0135432 A1 | 7/2003 | McIntyre et al. | |
| 2003/0187759 A1 | 10/2003 | Arthus et al. | |
| 2004/0044563 A1 | 3/2004 | Stein | |
| 2004/0044624 A1 | 3/2004 | Katou et al. | |
| 2004/0210527 A1 | 10/2004 | Woda et al. | |
| 2005/0015455 A1 | 1/2005 | Liu | |
| 2005/0033668 A1 | 2/2005 | Garcia et al. | |
| 2005/0144052 A1 | 6/2005 | Harding et al. | |
| 2005/0149455 A1 | 7/2005 | Bruesewitz et al. | |
| 2005/0197892 A1 | 9/2005 | Bilibin et al. | |
| 2006/0047598 A1 | 3/2006 | Hansen | |
| 2006/0048155 A1 | 3/2006 | Wu et al. | |
| 2006/0224398 A1 | 10/2006 | Lakshman et al. | |
| 2006/0253458 A1 | 11/2006 | Dixon et al. | |
| 2007/0078675 A1 | 4/2007 | Kaplan | |
| 2007/0083523 A1 | 4/2007 | Gerard et al. | |
| 2007/0106582 A1 | 5/2007 | Baker et al. | |
| 2007/0112667 A1 | 5/2007 | Rucker | |
| 2007/0129999 A1 | 6/2007 | Zhou et al. | |
| 2007/0130109 A1 | 6/2007 | King et al. | |
| 2007/0168331 A1 | 7/2007 | Reddy et al. | |
| 2007/0174144 A1 | 7/2007 | Borders et al. | |
| 2007/0185779 A1 | 8/2007 | O'Kelley | |
| 2007/0192215 A1 | 8/2007 | Taylor et al. | |
| 2007/0214066 A1 | 9/2007 | Harding et al. | |
| 2007/0255606 A1 | 11/2007 | Huang et al. | |
| 2008/0027737 A1 | 1/2008 | Watkins | |
| 2008/0071638 A1 | 3/2008 | Wanker | |
| 2008/0114885 A1 | 5/2008 | Kulkarni et al. | |
| 2008/0270209 A1 | 10/2008 | Mauseth et al. | |
| 2008/0301009 A1 | 12/2008 | Plaster et al. | |
| 2009/0037412 A1 | 2/2009 | Bard et al. | |
| 2009/0106397 A1 | 4/2009 | O'Keefe | |
| 2009/0119160 A1 | 5/2009 | Woda et al. | |
| 2009/0119161 A1 | 5/2009 | Woda et al. | |
| 2009/0138441 A1 | 5/2009 | Valentine et al. | |
| 2009/0144070 A1 | 6/2009 | Psota et al. | |
| 2009/0157667 A1 | 6/2009 | Brougher et al. | |
| 2009/0164338 A1 | 6/2009 | Rothman | |
| 2009/0187575 A1 | 7/2009 | DaCosta | |
| 2009/0292568 A1 | 11/2009 | Khosravani et al. | |
| 2009/0300720 A1 | 12/2009 | Guo et al. | |
| 2010/0114776 A1 | 5/2010 | Weller et al. | |
| 2010/0161734 A1 | 6/2010 | Wang | |
| 2010/0274609 A1 | 10/2010 | Shoemaker et al. | |
| 2010/0274791 A1 | 10/2010 | Chow et al. | |
| 2011/0066493 A1 | 3/2011 | Faith et al. | |
| 2011/0087613 A1 | 4/2011 | LaPasta et al. | |
| 2011/0137747 A1 | 6/2011 | Sapin Bodeman et al. | |
| 2011/0173116 A1 | 7/2011 | Yan et al. | |
| 2011/0225076 A1 | 9/2011 | Wang et al. | |
| 2011/0238575 A1 | 9/2011 | Nightengale et al. | |
| 2011/0258118 A1 | 10/2011 | Ciurea | |
| 2012/0109749 A1 | 5/2012 | Subramanian et al. | |
| 2012/0130917 A1 | 5/2012 | Forsblom | |
| 2012/0170733 A1 | 7/2012 | Chauvel et al. | |
| 2012/0185404 A1 | 7/2012 | Koh | |
| 2012/0209771 A1 | 8/2012 | Winner et al. | |
| 2012/0310786 A1 | 12/2012 | Suzuki | |
| 2012/0316990 A1 | 12/2012 | Fallows | |
| 2012/0316991 A1 | 12/2012 | Fallows | |
| 2013/0080362 A1 | 3/2013 | Chang et al. | |
| 2013/0204744 A1 | 8/2013 | Grass et al. | |
| 2013/0290127 A1 | 10/2013 | Finseth | |
| 2013/0325592 A1 | 12/2013 | Woda et al. | |
| 2013/0332385 A1 | 12/2013 | Kilroy et al. | |
| 2016/0140561 A1 | 5/2016 | Cowan | |
| 2017/0345004 A1 | 11/2017 | Cowan | |
| 2018/0330378 A1 | 11/2018 | Fredinburg et al. | |

FOREIGN PATENT DOCUMENTS

| | | |
|---|---|---|
| JP | 2004-287966 A | 10/2004 |
| JP | 2006-521149 A | 9/2006 |
| JP | 2008-097230 A | 4/2008 |
| JP | 2010-123038 A | 6/2010 |
| KR | 10-2002-0021956 A | 3/2002 |
| KR | 10-2006-0020874 A | 3/2006 |
| KR | 10-2007-0091527 A | 9/2007 |
| KR | 10-2009-0000700 A | 1/2009 |
| KR | 10-2010-0011393 A | 2/2010 |
| WO | 02/097563 A2 | 12/2002 |
| WO | 03/098510 A1 | 11/2003 |
| WO | 2004/084701 A2 | 10/2004 |
| WO | 2011/112418 A2 | 9/2011 |
| WO | 2011/112418 A3 | 1/2012 |

(56) References Cited

FOREIGN PATENT DOCUMENTS

| WO | 2012/170733 A1 | 12/2012 |
|---|---|---|
| WO | 2013/155022 A1 | 10/2013 |

OTHER PUBLICATIONS

Bahl, "U.S. Office Action issued in co-pending U.S. Appl. No. 13/692,959, filed Dec. 3, 2012", dated Jun. 12, 2019, 14 pages.
Bahl "U.S. Office Action issued in copending U.S. Appl. No. 13/692,959, filed Dec. 3, 2012", dated Nov. 26, 2019, 16 pages.
Bahl "U.S. Office Action issued in copending U.S. Appl. No. 13/692,959, filed Dec. 3, 2012", dated Oct. 30, 2018, 15 pages.
U.S. Appl. No. 15/675,492 to Cowan et al. filed Aug. 11, 2017.
U.S. Appl. No. 13/935,400 to Cowan et al. filed Jul. 3, 2013.
U.S. Appl. No. 12/109,772 to Mauseth et al. filed Apr. 25, 2008.
U.S. Appl. No. 12/720,082 to Wang et al. filed Mar. 9, 2010.
U.S. Appl. No. 13/443,675 to Ciurumelea et al. filed Apr. 10, 2012.
U.S. Appl. No. 13/673,867 to Fredinburg et al. filed Nov. 9, 2012.
U.S. Appl. No. 13/692,959 to Jackson et al. filed Dec. 3, 2012.
U.S. Appl. No. 14/256,902 to Mauseth et al. filed Apr. 18, 2014.
Anastasov, "European Office Action issued in European Application No. 13744415.4", dated Oct. 16, 2014, 8 pages.
Anastasov, "Extended European Search Report issued in European Application No. 13744415.4", dated Mar. 3, 2014, 7 pages.
Androutsopoulos, et al., "Learning to Filter Spam E-Mail: A Comparison of a Naive Bayesian and a Memory-Based Approach", Proceedings of the Workshop—Machine Learning and Textual Information Access, Sep. 2000, 12 pages.
Argamon, et al., "Routing documents according to style", 1998, 8 pages.
Bahl, "U.S. Office Action issued in copending U.S. Appl. No. 13/692,959, filed Dec. 3, 2012", dated Sep. 8, 2014, 15 pages.
Bahl, "U.S. Office Action issued in copending U.S. Appl. No. 13/692,959, filed Dec. 3, 2012", dated Apr. 27, 2015, 25 pages.
Bahl, "U.S. Office Action issued in copending U.S. Appl. No. 13/692,959, filed Dec. 3, 2012", dated Dec. 20, 2016, 34 pages.
Bahl, "U.S. Office Action issued in copending U.S. Appl. No. 13/692,959, filed Dec. 3, 2012", dated Mar. 28, 2018, 40 pages.
Bahl, "U.S. Office Action issued in copending U.S. Appl. No. 13/692,959, filed Dec. 3, 2012", dated May 26, 2016, 45 pages.
Bai, "International Preliminary Report on Patentability issued in International Application No. PCT/US2011/027014", dated Sep. 20, 2012, 10 pages.
Becamel, "International Preliminary Report on Patentability issued in International Application No. PCT/US2012/041419", dated Dec. 27, 2013, 6 pages.
Becamel, "International Preliminary Report on Patentability issued in International Application No. PCT/US2013/035688", dated Oct. 23, 2014, 7 pages.
Berko, "Office Action issued in Australian Application No. 2011224687", dated Sep. 26, 2013, 6 pages.
Bowman, "Hotmail Spam Filters Block Outgoing E-mail", Free Email Marketing Tool, Jan. 18, 2001, 7 pages.
BuySAFE, "BuySAFE Introduces Referral Program for Online Auction Protection Service", Dec. 16, 2003, 2 pages.
BuySAFE, "BuySAFE Solves Retail Websites' Number one Problem: Gaining Buyer Confidence", Jun. 1, 2006, 2 pages.
BuySAFE, "Just in Time for the Holidays; buySAFE and the Hartford launch First Bonding Service to Protect Consumers from Online Shopping Risks", Nov. 17, 2003, 3 pages.
Chumpitaz, "U.S. Office Action issued in copending U.S. Appl. No. 13/692,959, filed Dec. 3, 2012", dated Oct. 8, 2013, 16 pages.
Cunningham, et al., "A Case-Based Approach to Spam Filtering that Can Track Concept Drift", May 13, 2003, 9 pages.
Danneman, "U.S. Office Action issued in copending U.S. Appl. No. 12/109,772, filed Apr. 25, 2008", dated Feb. 4, 2011, 22 pages.
Danneman, "U.S. Office Action issued in copending U.S. Appl. No. 12/109,772, filed Apr. 25, 2008", dated Jul. 25, 2013, 23 pages.
Danneman, "U.S. Office Action issued in copending U.S. Appl. No. 12/109,772, filed Apr. 25, 2008", dated Jun. 24, 2011, 23 pages.
Danneman, "U.S. Office Action issued in copending U.S. Appl. No. 14/256,902, filed Apr. 18, 2014", dated Jun. 10, 2016, 16 pages.
Danneman, "U.S. Office Action issued in copending U.S. Appl. No. 14/256,902, filed Apr. 18, 2014", dated Oct. 14, 2016, 21 pages.
Doo, "Office Action issued in Korean Application No. 10-2014-7031049", dated Jan. 19, 2015, 3 pages of English Translation and 3 pages of Korean Office Action.
Doo, "Office Action issued in Korean Application No. 10-2014-7031049", dated May 19, 2015, 6 pages of English Translation and 5 pages of Korean Office Action.
EBay, "EBay Buyer Protection", May 1, 2011, 7 pages. Retrieved at: http://web.archive.org/web/20110501062428/http://pages.ebay.com/help/ . . . .
EBay Inc., "EBay Buyer Protection", How Does eBay Buyer Protection Work, May 27, 2011, 1 page. Retrieved at: http://web.archive.org/web/20110527130621/http://pages.ebay.com/cove . . . .
Fawcett, "In vivo" Spam Filtering: A Challenge Problem for KDD, SIGKDD Explorations, vol. 5, Issue 2, Dec. 2003, pp. 140-148.
Feeney, "U.S. Office Action issued in copending U.S. Appl. No. 13/157,269, filed Jun. 9, 2011", dated Aug. 1, 2013, 26 pages.
Firepoppy, "Broker Pro", May 19, 2011, 1 page. Retrieved at: http://replay.web.archive.org/20030822021619/http://www.firepoppy . . . .
Shopatron, "Letter from Ed Stevens To Jim Hudson", Sep. 12, 2000, 6 pages.
Firepoppy, "Shopatron FAQ", Jan. 17, 2004, 3 pages. Retrieved at: http://replay.web.archive.org/20040117021450/http://www.firepoppy . . . .
Firepoppy, "XML Connects to Almost Anything", Firepoppy.Broker.Pro, Aug. 22, 2003, 1 page. Retrieved at: http://replay.web.archive.org/20030822021619/http://www.firepoppy . . . .
Gee, "Using Latent Semantic Indexing to Filter Spam", 2003, 5 pages.
Graham, "Attacks and Countermeasures: The Future of Spam", Computer Security Journal, CSI Computer Security Institute, Jan. 2003, 6 pages.
Hong, "International Search Report and Written Opinion issued in International Application No. PCT/US2012/041419", dated Sep. 24, 2012, 7 pages.
Khan, "Office Action received for Canada Patent Application No. 2,869,888", dated Nov. 21, 2014, 7 pages.
Kwak, "International Search Report and Written Opinion issued in International Application No. PCT/US2011/027014", dated Nov. 24, 2011, 13 pages.
Misiaszek, "U.S. Office Action issued in copending U.S. Appl. No. 13/247,966, filed Sep. 28, 2011", dated Feb. 17, 2012, 11 pages.
Misiaszek, "U.S. Office Action issued in copending U.S. Appl. No. 13/247,966, filed Sep. 28, 2011", dated Oct. 3, 2013, 12 pages.
Misiaszek, "U.S. Office Action issued in copending U.S. Appl. No. 13/247,966, filed Sep. 28, 2011", dated Apr. 9, 2014, 13 pages.
Misiaszek, "U.S. Office Action issued in copending U.S. Appl. No. 13/247,966, filed Sep. 28, 2011", dated Feb. 27, 2013, 13 pages.
Misiaszek, "U.S. Office Action issued in copending U.S. Appl. No. 13/247,966, filed Sep. 28, 2011", dated Sep. 14, 2012, 13 pages.
Misiaszek, "U.S. Office Action issued in copending U.S. Appl. No. 13/247,966, filed Sep. 28, 2011", dated Nov. 26, 2014, 15 pages.
Misiaszek, "U.S. Office Action issued in copending U.S. Appl. No. 13/247,966, filed Sep. 28, 2011", dated Jun. 17, 2015, 6 pages.
Misiaszek, "U.S. Office Action issued in copending U.S. Appl. No. 13/247,966, filed Sep. 28, 2011", dated Apr. 20, 2016, 9 pages.
Misiaszek, "U.S. Office Action issued in copending U.S. Appl. No. 13/247,966, filed Sep. 28, 2011", dated Jan. 8, 2016, 9 pages.
Munro, "Australian Office Action issued in Australian Application No. 2016203131", dated Aug. 29, 2017, 3 pages.
Munro, "Australian Office Action issued in Australian Application No. 2016203131", dated Mar. 21, 2017, 3 pages.
Zimmerman, "U.S. Office Action issued in copending U.S. Appl. No. 13/935,400, filed Jul. 3, 2013", dated Feb. 2, 2017, 9 pages.
Munro, "Office Action issued in Australian Application No. 2012267754", dated Feb. 18, 2015, 3 pages.

(56) References Cited

OTHER PUBLICATIONS

O'Brien, et al., "Spam Filters: Bayes vs. Chi-squared; Letters vs. Words", Sep. 2002, pp. 291-296.
Oh, "International Search Report and Written Opinion issued in International Application No. PCT/US2013/035688", dated Jul. 12, 2013, 8 pages.
Quah, et al., "Real-time Credit Card Fraud Detection Using Computational Intelligence", Expert systems with Applications, vol. 35, Issue 4, Nov. 2008, pp. 1721-1732.
Shopatron, "Screen shots Shopatron", Aug. 10, 2000, 7 pages.
Singh, "U.S. Office Action issued in copending U.S. Appl. No. 13/443,675, filed Apr. 10, 2012", dated Jun. 21, 2012, 14 pages.
Steinhauer, "Yahoo Boss Finds Profit in Searches", Apr. 10, 2003, 3 pages.
Tran, "U.S. Office Action issued in copending U.S. Appl. No. 13/673,867, filed Nov. 9, 2012", dated Nov. 13, 2017, 17 pages.
Tran, "U.S. Office Action issued in copending U.S. Appl. No. 13/673,867, filed Nov. 9, 2012", dated Jul. 16, 2014, 12 pages.
Tran, "U.S. Office Action issued in copending U.S. Appl. No. 13/673,867, filed Nov. 9, 2012", dated May 3, 2018, 16 pages.
Tran, "U.S. Office Action issued in copending U.S. Appl. No. 13/673,867, filed Nov. 9, 2012", dated Jan. 21, 2015, 17 pages.
Tran, "U.S. Office Action issued in copending U.S. Appl. No. 13/673,867, filed Nov. 9, 2012", dated Jun. 23, 2017, 20 pages.
Tran, "U.S. Office Action issued in copending U.S. Appl. No. 13/673,867, filed Nov. 9, 2012", dated Jan. 20, 2016, 22 pages.
Tran, "U.S. Office Action issued in copending U.S. Appl. No. 13/673,867, filed Nov. 9, 2012", dated Dec. 28, 2016, 23 pages.
Wolles, "Extended European Search Report issued in European Application No. 11753825.6", dated Jul. 8, 2016, 8 pages.
Wong, "U.S. Office Action issued in copending U.S. Appl. No. 12/720,082, filed Mar. 9, 2010", dated Jul. 23, 2014, 14 pages.
Wong, "U.S. Office Action issued in copending U.S. Appl. No. 12/720,082, filed Mar. 9, 2010", dated Dec. 15, 2011, 17 pages.
Wong, "U.S. Office Action issued in copending U.S. Appl. No. 12/720,082, filed Mar. 9, 2010", dated May 10, 2012, 17 pages.
Wong, "U.S. Office Action issued in copending U.S. Appl. No. 12/720,082, filed Mar. 9, 2010", dated Dec. 24, 2014, 6 pages.
Zacharia, et al., "Collaborative reputation mechanisms for electronic marketplaces", Jul. 19, 2013, 18 pages.
Zacharia, et al., "Collaborative Reputation Mechanisms for Electronic Marketplaces", Jan. 1, 2000, 18 pages.
Zimmerman, "U.S. Office Action issued in copending U.S. Appl. No. 13/935,400, filed Jul. 3, 2013", dated Aug. 26, 2015, 15 pages.
Zimmerman, "U.S. Office Action issued in copending U.S. Appl. No. 13/935,400, filed Jul. 3, 2013", dated Aug. 24, 2016, 7 pages.
Zimmerman, "U.S. Office Action issued in copending U.S. Appl. No. 13/935,400, filed Jul. 3, 2013", dated Feb. 29, 2016, 7 pages.

\* cited by examiner

METHOD, MEDIUM, AND SYSTEM FOR FRAUD PREVENTION BASED ON USER ACTIVITY DATA

CROSS-REFERENCE TO RELATED APPLICATION

This application is a continuation of and claims priority to U.S. patent application Ser. No. 15/675,492, filed Aug. 11, 2017 and entitled "Method, Medium, and System for Online Fraud Prevention", which is a continuation of and claims priority to U.S. patent application Ser. No. 13/935,400, filed Jul. 3, 2013, and entitled "Method, Medium, and System for Online Fraud Prevention Based on User Physical Location Data." The entire contents of the above-identified priority application are hereby fully incorporated herein by reference.

TECHNICAL FIELD

The present disclosure relates generally to fraud prevention, and more particularly to methods and systems that rely on user-provided activity data, such as user search history, to detect possible fraudulent activity for purchase transactions involving a financial account of the user.

BACKGROUND

Electronic commerce, such as online shopping, has been increasingly common since the advent of the Internet. Online shopping web sites generally provide a user interface for customers to select products to purchase. After the customer has selected products for purchase, the customer typically may choose from multiple payment options to purchase the products.

One conventional payment option generally supported by both merchant storefronts and online merchants is the use of a user financial account, such as a credit card account. To make an online purchase with a credit card, for example, a user will commonly enter necessary credit card information online. For example, a user wishing to purchase a product online will enter an account identifier (such as a credit card number, debit card number, etc.), shipping information, and the name, address, and contact information of the user. To make a purchase at a merchant storefront, the user will typically swipe the card or provide the card to a merchant storefront operator that manually enters the credit card information.

Although the use of user financial accounts to conduct purchase transactions is convenient for both the user and the merchant, relying on user financial accounts to conduct purchase transactions is subject to fraudulent activity. For example, it is becoming increasingly difficult for online shoppers to keep their credit card information confidential and out of the possession of those who would use that information for fraudulent purposes. Likewise, users that keep a physical credit card must worry about theft of the physical card or the information contained thereon. Merchants themselves even present a potential risk to a user, whether through negligence or intentional fraud. For example, an employee of a merchant may submit erroneous transaction information to the financial institution issuing the financial account.

Once a user's financial information is stolen, the user—and the financial institution issuing the financial account—has limited means of determining whether subsequent purchases are legitimate or fraudulent. And while fraud detection systems have been developed that rely on historical transaction data of the user in an attempt to predict subsequent user transactions, the narrow focus of these systems on user transaction history continues to leave users vulnerable to fraud. Such systems are thus inadequate at detecting fraud.

SUMMARY

In certain example aspects described herein, a computer-implemented method for transaction risk analysis is provided. A risk analysis system receives a registration from a user that desires to have their purchase transactions monitored for possible fraudulent activity. The risk analysis system, for example, receives user activity data associated with a user, such as online activity information that is generated by the user's online activity. The risk analysis system associates the user activity data with a record for the user. The risk analysis system then receives a purchase transaction request, such as from a merchant computing system. The purchase transaction request identifies a product for a purchase transaction involving a financial account of the user and provides information sufficient to identify the record of the user.

Based on the information in the purchase transaction request, for example, the risk analysis system identifies the record of the user. The risk analysis system then compares the identity of the product with the online activity information for the user to determine a purchase transaction indicator for the product in the online activity information. The purchase transaction indicator, for example, provides an indication that the user may purchase the product. Based on the comparison of the identity of the product with the online activity information for the user, the risk analysis system determines a risk score or indicator for the purchase transaction and communicates the risk score or indicator to the merchant computing system.

In certain other example aspects, a system for transaction risk analysis provided herein. Also provided in certain aspects is a computer program product to analyze transaction risk.

These and other aspects, objects, features and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
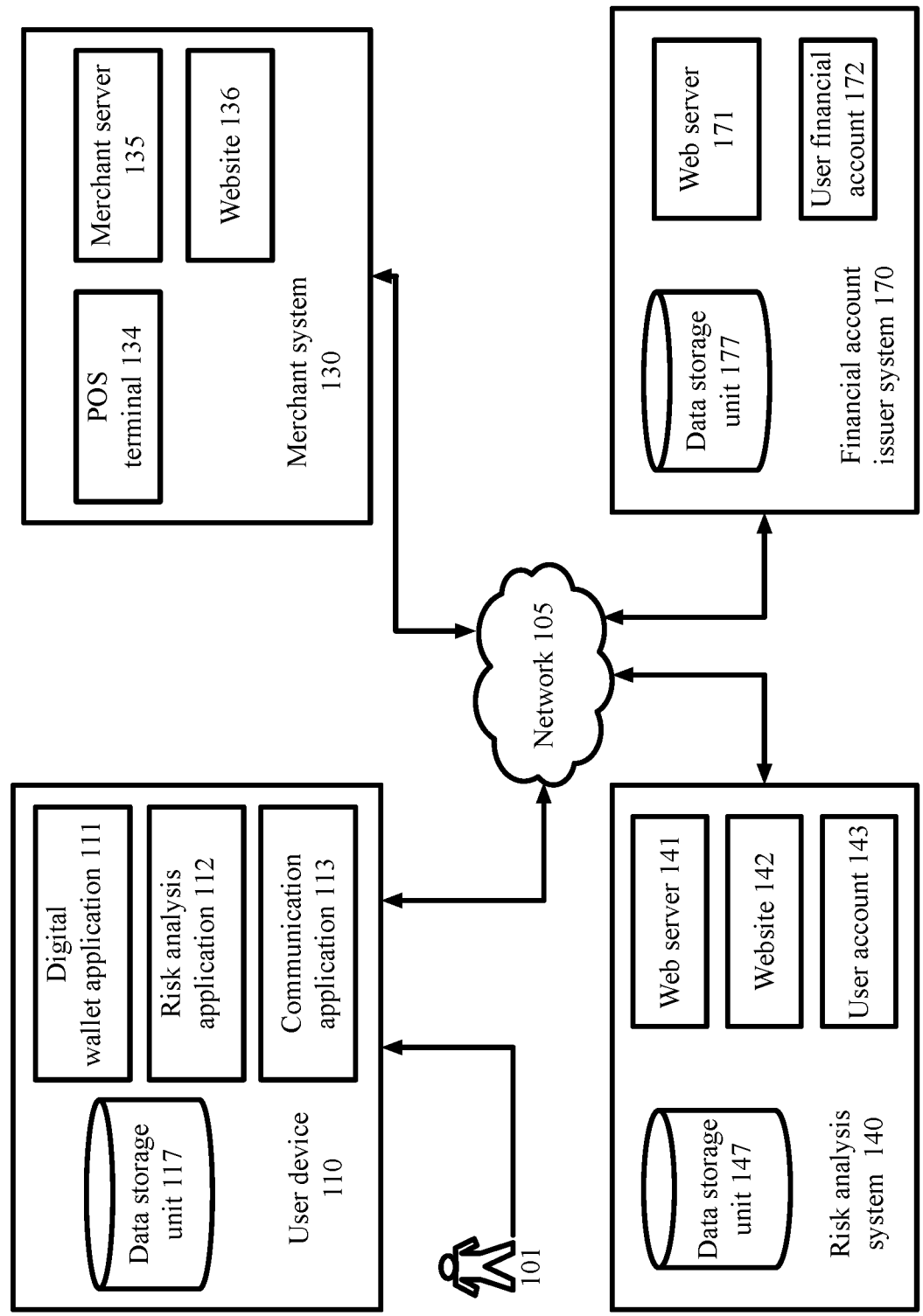
FIG. 1 is a block diagram depicting a system for determining transaction risk for a purchase transaction, in accordance with certain example embodiments.

As disclosed herein, a risk analysis system allows a participating user to have their purchase transactions monitored for possible fraudulent transactions. A user conducts activities related to a particular product or service, such as conducting searches to purchase a product online. At the option of the user, a risk analysis system receives and stores user activity data about the product. For example, the user allows the risk analysis system to store the user's search history for the product. When a purchase attempt is made with the user's financial account at a merchant, for example, the merchant sends a purchase transaction request to the risk analysis system for evaluation of the purchase transaction. Based on the request, the risk analysis system locates the record for the user and determines whether the product is identified in the user activity data. If the product is identified, the risk analysis system provides a risk score to the merchant indicating that the purchase transaction is not likely to be fraudulent. Alternatively, the product being identified in the user activity can be used as a positive factor among multiple factors considered in a risk analysis of the transaction. An absence of the product being identified in the user activity can be used as a neutral or negative factor among multiple factors considered in a risk analysis of the transaction.

More particularly, a user registers with the risk analysis system. As part of the registration, the user provides the user's name and other information so that the risk analysis system can create an account (or record) for the user. In certain examples, the user may also provide a user name and password so that the user can access a user account of the risk analysis system. The user may also provide one or more user financial accounts, such as a credit card account or a debit card account, that the user intends the risk analysis system to monitor. The risk analysis system also receives an authorization from the user to monitor the activities of the user. For example, in certain example embodiments the user may activate or otherwise authorize an application executing on the user device to monitor the user's activities, such as the user's online activities or the location of the user device. In order to obtain the benefits of the techniques herein and such monitoring, the user may have to select a setting or install an application.

Following user registration, a user conducts activity related to a product or service. The activity can encompass any activity related to a product or service. For example, the user may conduct online activities, such as researching a product online to learn more about the product. A user interested in purchasing a television, for instance, may research product specifications online or conduct online price comparisons for particular televisions. A user may also email a friend about a television the user intends to purchase. The user may later post information about the purchased television in a social network of the user, or prior to purchase post information about a television the user is considering purchasing. In other examples, a user may research particular vacation destinations, airfare, or other products or services related to a destination online. The user may also email friends about a planned vacation or share vacation destination ideas on line. A user may also post information online about a trip the user has recently taken. In certain examples, the user may visit a merchant storefront to examine a product. For example, the user may visit several electronics stores while shopping for a television.

Based on the user's authorization for the risk analysis system to determine the user's activities, the risk analysis system receives relevant user activity data. That is, at the option of the user, the risk analysis system receives information about the user's activities related to products and services. For example, the risk analysis system receives the user's search history regarding the television the user intends to purchase. The risk analysis system may also receive any other online user activity related to a product or service, such as the user's search history regarding a vacation destination or user emails. For example, the risk analysis system may receive emails pertaining to products and services, such as emails about a planned vacation or a vacation the user has recently taken. The risk analysis system may also receive information for products or services that the user shares online, such as in a social network.

In addition to the user's online activities, the risk analysis system may receive authorized location data for the user device. That is, if the user includes their location information as part of the user activity to be monitored, the risk analysis system receives location data from the user device regarding locations pertinent to products and services. For example, if a user visits an electronics store, such as in the user's search for a television, the risk analysis system may receive location data for the electronics store. Likewise, if a user visits a travel agent, such as while planning a vacation, the risk analysis system may receive location data for the travel agent. The user device can obtain the location data by any suitable method, such as through a location service that relies on a global positioning system ("GPS") or Wi-Fi hotspots and cellular communication towers available to the user device. The location data can comprise any information that establishes the location of the user's computing device, such as a street address, Ordnance Survey Grid Reference information, and/or latitude and longitude coordinates for points of interest.

After receiving the activity data of the user and at the option of the user, the risk analysis system associates the activity data with a record for the user. That is, the risk analysis system stores the user activity data in an accessible account record associated with the user, so that the risk analysis system can later access the activity. For example, when the risk analysis system receives the name of the user or user account information, such as from a merchant as described herein, the risk analysis system can locate the record of the user, along with the stored user activity data associated with the user account.

After the risk analysis system has received and stored user activity data for a particular user, the risk analysis system receives a purchase transaction request for a purchase transaction involving a financial account of the user. For example, a purchaser attempts to purchase a product with a financial account of the user at a point-of-sale terminal of a merchant, such as by swiping a credit card. Before completing the purchase transaction, the merchant sends a request to the risk analysis system to receive a risk score for the purchase transaction. The request incased, for example, information sufficient to identify the record for the user, as well as information about the product or service that was (or will be) purchased. For example, the purchase transaction request may identify a financial account of the user that a purchaser has presented to complete the purchase transaction. The purchaser may be the user, in which case the purchase transaction would likely not be fraudulent. If the purchaser is not the user, however, the transaction is likely fraudulent. In certain example embodiments, after a purchase transaction is complete, the merchant or a custodian of the financial account such as the account issuer, for example, may send a purchase transaction request regarding the purchase transaction. The risk analysis system then receives the request and provides a risk score to the financial account issuer.

The risk analysis system determines a risk score or risk indicator for the purchase transaction based on the information received in the purchase transaction request and the information in the user activity data. The risk analysis system reads the content of the purchase transaction request to identify the product or service that is the subject of the purchase transaction. For example, the risk analysis system may determine that the purchase transaction concerns a television or an airline ticket, such as an airline ticket to a particular vacation destination. The risk analysis system also determines user-identity information from the request, such as by reading the account information used in the purchase transaction. The risk analysis system then uses the user identification information to locate the record of the user corresponding to the identification information.

After identifying the user record based on the user information, the risk analysis system compares the identified product or service to the user activity record to determine purchase transaction indicators for the product. That is, the risk analysis system reads the stored user activity history for any sign or other indication that the user would purchase the product or service of the purchase transaction. The indicators can comprise any connection or correlation between the product or service identified in the purchase transaction request and the activity data associated with the record for the user. For example, a user search history for a television would constitute an indicator that the user may purchase the television. Likewise, location data showing that the user device (and hence the user) was recently at an electronics store may also serve as an indicator that the user would purchase a television. A user search history for a particular vacation destination—or an email or social network entry about the destination—may serve as an indicator that the user, for example, would purchase airfare (or other fare) to the vacation destination.

Based on the purchase transaction indicators that the risk analysis system determines from the user activity data, the risk analysis system generates a risk score or risk indicator for the purchase transaction. The risk analysis system then communicates the risk score or risk indicator to the entity, such as a merchant, that sought the risk score. For example, if the risk analysis system is unable to determine any purchase transaction indicators for the purchase transaction, the risk analysis system generates a neutral or negative score or indicator for the purchase transaction.

In certain examples, a neutral or negative score reflects the fact that nothing in the user activity data suggests that the user would purchase the product or service associated with the purchase transaction. A merchant providing a purchase transaction request for the purchase of a television, for example, may receive a neutral or negative score when nothing in the user activity indicates that the user would purchase the television. Based on the neutral or negative score, the merchant may thus conclude that the purchaser is fraudulently attempting to buy the television or may look for other indicators of fraudulent activity. Hence, the negative risk-score may also prompt the merchant to require additional identification from the purchaser to confirm the purchaser's identity and the validity of the purchase transaction. Additionally, an absence of the product being identified in the user activity can be used as a neutral or negative factor (or indicator) among multiple factors considered in a risk analysis of the transaction.

In contrast, if the risk analysis system determines purchase transaction indicators in the user activity data, the risk analysis system generates a positive score in response to the purchase transaction request. As noted above, user activity data indicating that a user would purchase a television would operate as a purchase transaction indicator for a purchase transaction involving a television. Based on the identification of such an indicator, the risk analysis system would generate a positive score in response to the purchase transaction request for the purchase transaction involving the television. Likewise, if the risk analysis system identified a purchase transaction indicator for airfare to a vacation destination—such as a user search history concerning the vacation destination—the risk analysis system would generate a positive risk score for the airfare purchase. If the product is identified, the risk analysis system provides a risk score to the merchant indicating that the purchase transaction is not likely to be fraudulent. Alternatively, the product being identified in the user activity can be used as a positive factor (or indicator) among multiple factors considered in a risk analysis of the transaction.

In certain examples, the risk score that the risk analysis system generates is qualitative. For example, the identification of one or more purchase transaction indicators may result in a "Yes" response from the risk analysis system indicating that the purchase transaction is likely valid. In the absence of any purchase transaction indicators, a "No" response from the risk analysis system indicates that the risk analysis system cannot conform whether the transaction is fraudulent, or that the transaction may be fraudulent, and that hence the entity receiving the "No" response should take precautions or request additional information prior to approving the transaction.

In other examples, the determined risk score is quantitative. That is, the risk analysis system may configure the risk score to correspond to the number and/or weight of the identified indicators. For example, a single purchase transaction indicator for a particular purchase transaction may result in a low score, whereas the identification of multiple purchase transaction indicators for the purchase transaction results in a high score. A single purchase transaction indicator that a user would purchase a television, for example, may result in a risk score of "1." The identification of two indicators, however—such as a search history for the television and location data placing the user device near an electronics store—may results in a risk score of "5" or "6." If additional purchase transaction indicators are determined, such as user emails regarding a television purchase, then a higher score of "9" or "10" may be generated, thus indicating a very low likelihood that the purchase transaction is fraudulent. Additionally or alternatively, the risk analysis system may weight different purchase transaction indicators differently when generating a risk score. For example, when the purchase transaction involves a television, user emails about a television may receive more or less weight than location data placing the user device near an electronics score.

In certain examples, a financial account of the user is associated with the risk analysis system. For example, the risk analysis system may be associated with a digital wallet account of the user. Thus, when the user utilizes the digital wallet account to process a purchase transaction, the risk analysis system receives a purchase transaction authorization request from a merchant. In such examples, the purchase transaction authorization request can operate as a purchase transaction request. In other words, the risk analysis system determines a risk score as described herein before authorizing the transaction. In other examples, the risk analysis system may determine negative risk score for a purchase transaction after the transaction is completed, in which case the risk analysis system may communicate a warning to the user, merchant, financial account issuer, or other entity that the transaction may be fraudulent.

By using and relying on the methods and systems described herein, a user can increase the likelihood that fraudulent activity involving the user's purchase transactions is detected. In other words, by allowing the risk analysis system described herein determine and store user activity data—and provide purchase transaction risk-scores/indicators based on the user activity data—a user can increase the likelihood that fraudulent transactions involving the user's financial accounts will be detected. The methods and systems described herein not only benefit the user, but also merchants, financial account issuers, or any other entities seeking to reduce fraudulent purchase transactions.

Example System Architectures

Turning now to the drawings, in which like numerals indicate like (but not necessarily identical) elements throughout the figures, example embodiments are described in detail.

FIG. 1 is a block diagram depicting a system for determining transaction risk for a purchase transaction, in accordance with certain example embodiments.

As depicted in FIG. 1, the exemplary operating environment 100 includes a user network computing device 110, a merchant computing system 130, a risk analysis computing system 140, and a financial account computing system 170.

Each network 105 includes a wired or wireless telecommunication means by which network devices (including devices 110, 130, 140, and 170) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment. In some embodiments, a user 101 associated with a device must install an application and/or make a feature selection to obtain the benefits of the techniques described herein.

Each network computing device 110, 130, 140, and 170 includes a device having a communication module capable of transmitting and receiving data over the network 105. For example, each network device 110, 130, 140, and 170 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 130, 140, and 170 are operated by end-users or consumers, merchant system operators, risk analysis system operators, and financial account issuer system operators, respectfully.

The user 101 can use the communication application 113, such as a web browser application or a stand-alone application, to view, download, upload, or otherwise access documents or web pages via a distributed network 105. The network 105 includes a wired or wireless telecommunication system or device by which network devices (including devices 110, 120, 140, and 150) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, near field communication (NFC), or any combination thereof or any other appropriate architecture or system that facilitates the communication of signals, data, and/or messages.

The communication application 113 can interact with web servers or other computing devices connected to the network 105. For example, the communication application 113 can interact with the user network computing device 110, the merchant system 130, the risk analysis system 140, and the financial account system 170. The communication application 113 may also comprise a web browser (not shown), which provides a user interface, for example, for accessing other devices associated with the network 105.

The user computing device 110 may include a digital wallet application 111. The digital wallet application 111 may encompass any application, hardware, software, or process the user computing device 110 may employ to assist the user 101 in completing a purchase transaction. The digital wallet application 111 can interact with the communication application 113 or can be embodied as a companion application of the communication application 113. As a companion application, the digital wallet application 111 can execute within the communication application 113. That is, the digital wallet application 111 may be an application program embedded in the communication application 113.

The user computing device 110 may also include a risk analysis application 112. The risk analysis application 112, for example, communicates and interacts with the risk analysis system 140, such as via that the communication application 113. In order to obtain the benefits of the risk analysis system 140 as described herein, for example, a user 101 may have to download and install the risk analysis application 112. The risk analysis application 112, for example, may be configured, based on user preferences, to obtain, receive, and communicate activity data of the user 101, such as online activity information pertaining to the user's online activities. For example, the risk analysis application 112 may be configured to receive content of the websites that a user visits.

The risk analysis application 112 may also be configured to obtain, receive, and/or communicate location data for the user device 110. For example, the risk analysis application 112 may be configured to communicate and interact with a location service provider that, in conjunction with the user device 110, facilitates determination of the location of the user device 110. For example, the risk analysis application 112 may, along with a location service and/or hardware of the user device 110, rely on WiFi signals and cellular communication towers to determine the location of the user device 110. Additionally or alternatively, the risk analysis application 112 may rely on satellites, Global Positioning System ("GPS") location technology, a Network Location Provider ("NLP"), a map application, or other location identifying technology of the user device 110 to determine location data for the user device 110. In certain example embodiments, the risk analysis application 112 can interact with the digital wallet application 111 or can be embodied as a companion application of the digital wallet application 111. As a companion application, the risk analysis application 112 can execute within the digital wallet application 111. That is, the risk analysis application 112 may be an application program embedded in the digital wallet application 111. In certain example embodiments, the risk analysis application 112 executes and operates independently of the digital wallet application 111.

The user computing device 110 may also include a data storage unit 117. The example data storage unit 117 can include one or more tangible computer-readable storage devices. The data storage unit 117 can be a component of the user device 110 or be logically coupled to the user device 110. For example, the data storage unit 117 can include on-board flash memory and/or one or more removable memory cards or removable flash memory. In certain example embodiments, the data storage unit 117 may, at the option of the user, store activity data pertaining to the user 101.

The merchant computing system 130 represents a system that offers products and/or services for the user 101 to purchase or use. In certain example embodiments, the merchant system 130 includes a point-of-sale ("POS") terminal 134. The point-of-sale terminal 134 may be operated by a salesperson that enters purchase data into the point-of-sale terminal to complete a purchase transaction. The merchant system 130 may be a physical location or an online merchant or comprise both a physical location and an online merchant. Affiliated or associated with the merchant system 130 is a merchant system operator (not shown). The merchant computing system 130 comprises a merchant server 135, which in certain example embodiments may represent the computer-implemented system that the object provider system 120 employs to create and assemble a website 136 and content for the website 136.

The risk analysis system 140 represents a system for analyzing and determining fraud risk associated with a purchase transaction. The risk analysis system 140 is configured to interact with and receive data and information from the user computing device 110 via the network 105. For example, at the option of the user 101 the risk analysis system 140 is configured to receive user activity data from the user computing device 110, such as from the risk analysis application 112. The risk analysis system 140 is also configured to communicate with the merchant system 130 and the financial account system 170, such as via the network 105.

The risk analysis system 140 can include a web sever 141, which may represent the computer-implemented system that the risk analysis system 140 employs to determine fraud risk for a purchase transaction. For example, the risk analysis system 140 and associated web server 141 may be configured to obtain user activity data, associate the user activity data with a record for the user 101, read purchase transaction requests, identify purchase transaction indicators, and determine a risk score for a purchase transaction as described herein. The risk analysis system 140 may also include a website 142 and a user account 143. A user 101, for example, may utilize a user interface of the website 142 to register with the risk analysis system 140 and hence create a record with the risk analysis system 140, such as the user account 143.

The risk analysis system 140 may also include an accessible data storage unit 147. In certain example embodiments, for example, the data storage unit 147 stores activity data of the user 101. For example, the data storage unit 147 may receive and store online activity information generated from the user's online activities associated with the user device 110. The data storage unit 147 may also receive and store location data for the user device 110, such as cellular communication towers and Wi-Fi signals that are or have been available to the user device 110. The exemplary data storage unit 147 can include one or more tangible computer-readable media. The data storage unit 147 can be stored on the user device 110 or can be logically coupled to the user device 110. For example, the data storage unit 147 can include on-board flash memory and/or one or more removable memory cards or removable flash memory.

In certain example embodiments, the risk analysis functions of the risk analysis system 140 operate and execute fully and completely on the user device 110, such as within, or as a companion application to, the risk analysis application 112. Alternatively, the risk analysis functions of the risk analysis system 140 may operate and execute separately independently from the user device 110. For example, risk analysis system 140 may operate and execute within a separate computing system or other computing system that analyzes risk as described herein. Alternatively, in other example embodiments the risk analysis functions of the risk analysis system 140 may execute partially on the user device 110 and/or partially on a separate computing system. For example, the risk analysis functions of the risk analysis system 140 occur both via the risk analysis system 140 and the risk analysis application 112.

The financial account issuer system 170 comprises a financial account web server 171, which may represent the computer-implemented system that the financial account issuer system 170 employs to host a web site (not shown) of the financial account issuer system 170. The financial account web server 171 and associated website of the financial account issuer system 170 can also represent the computer-implemented system that the financial account issuer system 170 uses to create, provide, maintain, and administer a user financial account 172 for a user 101. The financial account issuer system 170 also comprises a data storage unit 177, which can used to store financial account information associated with a user financial account 172.

The financial account issuer system 170 is configured to receive and store financial account information from a user 101 and to create a user financial account 172. For example, financial account information from a user 101 can be received via the network 105 and stored in the data storage unit 177 of the financial account issuer system 170. The financial account issuer system 170 is also configured to communicate with the risk analysis system 140, the user device 110, and the merchant system 130, such as via the network. In other embodiments, the financial account issuer system 170 may communicate with the risk analysis system 140, the user device 110, and the merchant system 130 via convention credit card channels, such as through an acquirer associated card network (not shown).

It will be appreciated that the network connections shown are example and other means of establishing a communications link between the computers and devices can be used. Moreover, those having ordinary skill in the art and having the benefit of the present disclosure will appreciate that the user device 110, merchant system 130, risk analysis system 140, and the financial account issuer system 170 illustrated in FIG. 1 can have any of several other suitable computer system configurations. For example a user computing device 110 embodied as a mobile phone or handheld computer may not include all the components described above.

Example Processes

The components of the example operating environment 100 are described hereinafter with reference to the example methods illustrated in FIGS. 2-4.

Figure 2:
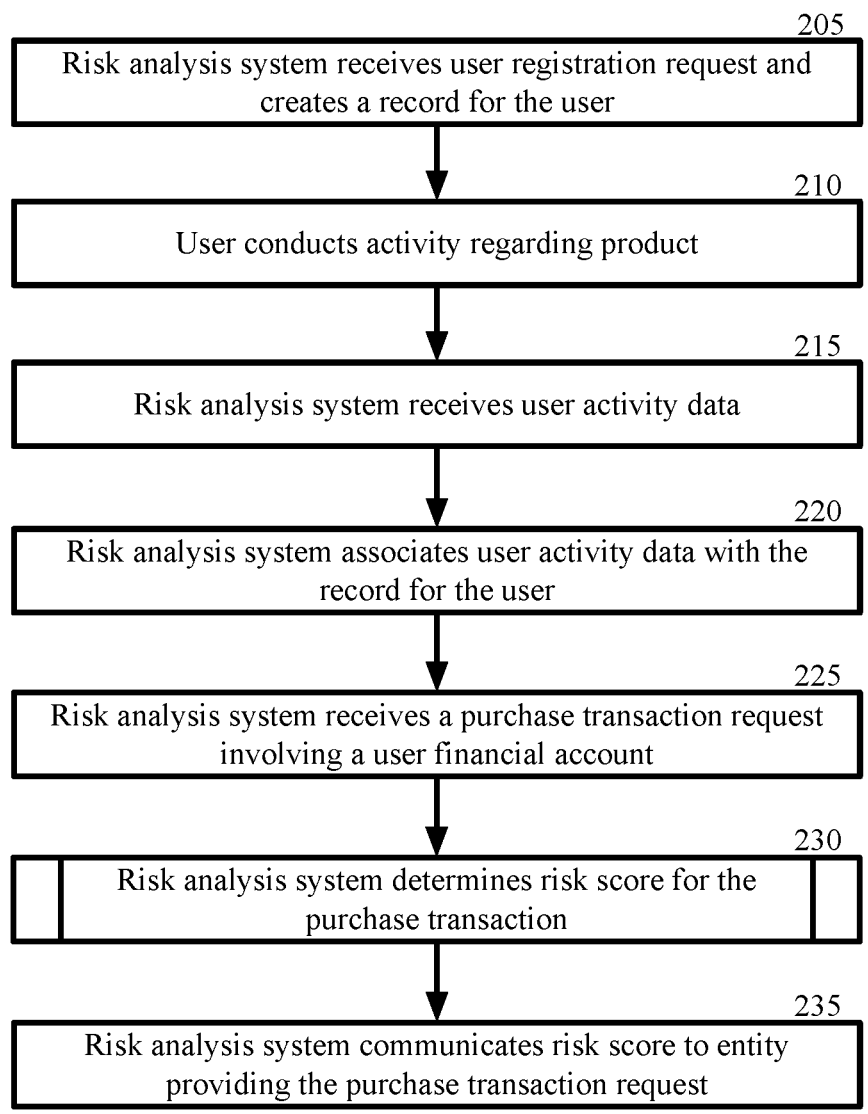
FIG. 2 is a block flow diagram depicting a method for transaction risk analysis for a purchase transaction, in accordance with certain example embodiments.

FIG. 2 is a block flow diagram depicting a method for transaction risk analysis for a purchase transaction, in accordance with certain example embodiments.

With reference to FIGS. 1 and 2, in block 205, a risk analysis system receives registration request of a user 101 and creates a record for the user 101. That is, a user 101 desiring to have one or more financial accounts 172 monitored for fraud risk establishes a record, such as a user account 143, with the risk analysis system 140. For example, the user 101 accesses a website 142 of the risk analysis system 140 to provide information about the user 101 to establish the account. The user information may comprise, for example, the name of the user 101 as well as contact information for the user 101 such as an email address, mailing address, or telephone number for the user 101. The user 101 may also provide or identify specific user financial accounts 172 that the user 101 intends the risk analysis system 140 to monitor. The user 101 may also provide or select configurable rules or preferences governing the user account 143, such as rules governing communications from the risk analysis system 140. For example, the user 101 may request to be notified every time the risk analysis system 140 provides a fraud risk score associated with a purchase transaction as described herein. When providing account information, the user 101 may also provide information regarding the user device 110, such as the Internet protocol address (IP address) for the user device 110.

In some embodiments, as part of the registration process, the user 101 also authorizes the risk analysis system 140 to obtain user activity data for the user 101. That is, the user 101 provides consent for the risk analysis system 140 to obtain information about the user's digital activities so that the risk analysis system 140 can monitor the user-specified accounts for potentially fraudulent purchase transactions. For example, the user 101 may authorize the risk analysis system 140 to receive and obtain user activity data, such as user search history data and user location data (based on the location of the user device 110). The user 101 may also authorize the risk analysis system 140 to access email accounts of the user 101. The user 101 may also authorize the risk analysis system 140 to access user data associated with social network websites the user 101 visits, such as posts or emails the user 101 communicates through the social network website. The risk analysis system 140 may also place cookies on the user device 110, at the option and consent of the user 101, so that the risk analysis system 140 can identify the user device 110. In order to obtain the benefits of such monitoring, the user may have to select a setting or install an application, such as the risk analysis application 112.

Based on the information that the user 101 provides when establishing an account, the risk analysis system 140 receives the information and establishes a record for the user 101, such as in the user account 143 of the risk analysis system 140. In certain example embodiments, the risk analysis system 140 provides the user 101 with online access to the user account 143. For example, the risk analysis system 140 establishes, with the user 101, a unique username and password that allow the user 101 to access the user account 143. By accessing the user account 143, the user 101 can change the user account rules and preferences, such as the rules regarding the communication of risk scores. The user 101 can also review and revoke any authorizations or consents that the user 101 granted to the risk analysis system 140 during the registration process, including those that permit the risk analysis system 140 to obtain and use user activity data for the user 101.

In block 210, the user 101 conducts activity regarding a product. The activity can encompass any activity related to a product. As used herein, a "product" comprises any tangible or intangible product, including services. For example, the product may include merchandise offered for sale at a merchant point-of-sale terminal or at an online retailer. In certain example embodiments, the user 101 may conduct activity for classes of products, such as electronics. In other examples, the user 101 may conduct activities for more specific products, such televisions or even a particular model of television.

In certain example embodiments, the user activity comprises online activity, such as searching or researching a product online. For example, a user 101 may conduct a product search via a web browser (not shown) on the user device 110. The user 101 may also visit product manufacturer websites to learn more about a particular product. For example, a user 101 interested in purchasing a television may research product specifications online or conduct online price comparisons for particular televisions. A user 101 may likewise visit a website 136 of a merchant system 130 that offers a particular product, such as a television, for sale. A user 101 looking for a particular service, for example, may visit websites that advertise the service or that provide references, reviews, or rankings for various providers of the service. For example, a user 101 looking for a television repair service may research available television repairmen. The user 101 may likewise research online reviews for a particular television repairman. In other examples, a user 101 may research particular vacation destinations, airfare, or other products or services related to vacation destinations online. A user may also search online for locations offering a product for sale.

Additionally or alternatively, in certain example embodiments the user activity comprises communications about a product online, such as on a social network website. For example, user 101 may post information about a product that the user 101 intends to purchase or that the user 101 has recently purchased. The user 101 may also, for example, share photos of the product or solicit information about the product on the social network website. For example, the user 101 may share photos of a vacation destination that the user 101 has visited or intends to visit. A user 101 may likewise comment on products that other users have purchased. For example, a user 101 provide an indication that the user 101 likes a particular product or service that is discussed on the social network website.

Additionally or alternatively, in certain example embodiments the user activity comprises electronic communications about a product, such as text messages or emails. For example, a user 101 may email a manufacturer seeking information about product specifications for a particular product. The user 101 may then receive a response email from the manufacturer regarding the product specifications for the product. The user 101 may likewise send or receive emails or texts regarding a product to other users 101. For example, a user 101 may email a contact about a particular television that the user 101 intends to purchase. A user 101 may also send email communicates to contacts or others, such as travel agents, regarding a vacation destination the user 101 intends to visit, for example.

Additionally or alternatively, in certain example embodiments the user activity comprises the user 101 obtaining online digital offers for a product of class of products. For example, the user 101 may visit one or more websites to clip digital offers for a product such as a discount offer on a television or vacation package. In certain example embodiments, the user 101 may save the coupons in a digital wallet account of the user 101, such as via the digital wallet application 111. The offer can be any type of offer, such as a ticket, coupon, discount, rebate, voucher, special offer, prepaid offer, or any other type of promotion that can be exchanged for a financial discount or rebate when purchasing a product or service, for example. For online retailers or merchants, for example, the offer may be any type of coupon code, promotional or promo code, discount code, key code, reward code, or any other type code of exchanged for a financial discount on a product.

In certain example embodiments, a user 101 may visit a merchant storefront, such as a merchant point-of-sale terminal, to research a product or to purchase a product. Thus, in addition to online activities such as searching for a product, the user activity may include the user 101 visiting a location pertaining to a product. For example, the user 101 may visit various electronics stores when researching a television. A user 101 planning a vacation may likewise visit a travel agent to make arrangements for the vacation.

As one skilled in the art will appreciate, a user 101 may visit a variety of different locations in connection with researching and/or purchasing a product. A user 101 will henna generate a variety of activity data regarding a user's location. It will also be appreciated that a user 101 may additionally or alternatively conduct a variety of online activities in connection with researching and/or purchasing a product. The user thus will generate a variety of activity data that includes online activity information.

In block 215, the risk analysis system 140 receives user activity data. That is, based on of the user's authorization for the risk analysis system 140 to receive data regarding the user's activities, the risk analysis system 140 receives content generated by the user's activities. For example, the risk analysis system 140 receives online activity information of the user 101 that is generated from the user's online activity, such as a search history of a registered user 101 when the user searches for or researches a product online. The risk analysis system 140 receives, for example, the user search history for televisions (or a particular television) of interest to the user 101. In another example, the risk analysis system 140 may receive a user search history, browser history, email, or text for airfare or other fare to a particular destination.

The risk analysis system 140 may likewise receive a web browsing history (or any other online history) related to any online activity of the user 101, such as a history of all the websites the user 101 visits. For example, the risk analysis system 140 may receive a web browsing history for social network sites that the user 101 visits to discuss a product. The risk analysis system 140 will also receive—at the option of the user 101 and as part of the online user activity data—electronic correspondence, such as emails and text messages regarding a product. For example, the risk analysis system 140 may receive email content from the user 101 to a product manufacturer about a particular product. The risk analysis system 140 may also receive user activity data regarding the location of the user device 110 (and hence the user 101). For example, the user activity data may comprise locations, such as electronics stores, that the user 101 has visited when researching or purchasing a television.

The risk analysis system 140 obtains the user activity data from any source associated with the user device 110 of the user 101. For example, the user activity data may come from search engine websites, web browsers, social network website accounts, contact list entries, email contacts, or other programs and applications running or operating on the user device 110. To obtain location data for the user device 110, the risk analysis application 112 may rely on a location provider service. For example, the location provider may rely on WiFi signals, cellular communication data, satellites, a Global Positioning System ("GPS") location technology, a Network Location Provider ("NLP"), a map application, or other location identifying technology of the user device 110 to determine the user device location. The risk analysis application 112 may also rely on WiFi hotspots that are available to the user device 110 to determine the location of the user device 110. The location data can comprise any information that establishes the location of the user device 110, such as a street address, Ordnance Survey Grid Reference information, and/or latitude and longitude coordinates of the device. In certain example embodiments, a risk analysis application 112 on the user device 110 receives the activity data from the user device 110 and communicates the activity data to the risk analysis system 140. The risk analysis system then receives the user activity data.

In block 220, the risk analysis system 140 associates user activity data with the user 101 in a record for the user. That is, after the risk analysis system 140 receives the user activity data for a particular user 101, the risk analysis system 140 identifies the record, such as the user account 143, corresponding to the user 101 the generated the activity data. For example, the risk analysis system 140 may identify the record of the user 101 based on cookies placed on the user device 110. The risk analysis system 140 may also determine the Internet protocol address (IP address) for the user device 110 from the user activity data. The risk analysis system 140 may also rely on other information provided by the user 101 to identify the record of the user 101, such as login credentials that the user 101 may provide when logging in to a search engine or social network website, for example.

After identifying the record of the user 101, the risk analysis system 140 links the user activity data with the user account 143 so that the activity data is accessible to the risk analysis system 140. For example, the risk analysis system 140 stores the user activity data, along with information for the user account 143, in the data storage unit 147 of the risk analysis system. In certain example embodiments, such as when the risk analysis system 140 operates completely or partially on the user device 110, the risk analysis application 112 may store all or part of the user activity data in the data storage unit 117 of the user device 110. The risk analysis system 140 and/or the risk analysis application 112 then access the use activity data as described herein to determine a risk score for a particular purchase transaction associated a user financial account 172.

In block 225, the risk analysis system 140 receives a purchase transaction request involving a user financial account 172. That is, once the risk analysis system 140 has associated user activity data with the record for a particular user 101, the risk analysis system receives receive a request to process a pending or completed purchase transaction involving the user's financial account 172. The purchase transaction comprises information identifying the user 101, such as an account number for the user's financial account 172, as well as information about the product being purchased (such as a television). For example, a purchaser attempts to purchase a product, such as a television, online or at a merchant point-of-sale terminal 134 using an account number associated with the user financial account 172. The purchaser, for example, may be the particular user 101 associated with the user financial account 172. But in other instances, such as when the information for the user's financial account 172 has been stolen, the purchaser may not be the user 101 and hence the purchase transaction is a fraudulent transaction. Based on the attempted purchase, a merchant operator (not shown) associated with the merchant system 130 sends a purchase transaction request to the risk analysis system 140, such as via the network 105. For example, the risk analysis system 140 and the merchant system 130 communicate via a Transmission Control Protocol (TCP)/Internet Protocol (IP). In other example embodiments, the merchant system 130 may rely on conventional credit card processing to indirectly communicate with the risk analysis system 140 over the conventional credit card channels. The risk analysis system 140 then receives the transaction request.

Additionally or alternatively, in certain example embodiments a custodian of the financial account, such as the financial account issuer system 170, may send the purchase transaction request. For example, when the financial account issuer system 170 may receive an authorization request for an identified product from a merchant system 130, such as through an acquirer associated with the merchant system 130. The financial account issuer system 170 may then send a purchase transaction request to the risk analysis system 140. In other example embodiments, the financial account issuer system 170 may send the risk analysis system 140 a purchase transaction request for a completed purchase transaction in order to assess the likelihood of fraud associated with the completed transaction. In other embodiments, the risk analysis system 140 may administer or otherwise operate as the custodian of one or more financial accounts for the user 101, such as a digital wallet account for the user 101. In such embodiments, the risk analysis system 140 may evaluate the risk of fraud as described herein for purchase transactions involving the digital wallet account for the user 101. For example, the risk analysis system 140 may receive the purchase transaction request information from the digital wallet application 111 on the user device 110 when the user 101 makes a purchase with the digital wallet application 111.

In block 230, the risk analysis system 140 determines a risk score for the purchase transaction. That is, the risk analysis system reads the purchase transaction request to identity both the product associated with the request and the user 101. For example, the risk analysis system 140 may determine that the product is a television. The risk analysis system 140 then locates the record for the identified user 101. The risk analysis system 140 then compares the identified product to the user activity data associated with the record for the user 101 to identify purchase transaction indicators for the product. For example, the risk analysis system 140 looks for a signal in the user activity data for the user 101 indicating that the user would purchase the identified product. If the product is a television, for example, the risk analysis system 140 may look for an indication regarding the particular television. Based on the identified purchase transaction indicators, the risk analysis system 140 determines a risk score for the purchase transaction. Example details of block 230 are described hereinafter with reference to FIG. 3.

In block 235, the risk analysis system 140 communicates the risk score to the entity providing the purchase transaction request. That is, after determining a risk score for the purchase transaction request, the risk analysis system 140 transmits the determined risk score to the entity providing the purchase transaction request, such as via the network 105. For example, the risk analysis system 140 communicates the risk score to a merchant that has provided a purchase transaction request for a television. If a custodian of the user financial account 172, such as the financial account issuer system 170, provides the purchase transaction request, then the risk analysis system 140 communicates the risk score to the custodian. The risk score, for example, operates to inform the entity providing the purchase transaction request of the fraud risk associated with the purchase transaction. In certain example embodiments, the risk analysis system 140 may also communicate the risk score to the user 101. After receiving the risk score, the entity receiving the score can take whatever action is appropriate in view of the received risk score, such as asking for additional identity verification from the purchaser.

If the product is identified in the user activity data, for example, the risk analysis system 140 provides a risk score to the merchant system 130, for example, indicating that the purchase transaction is not likely to be fraudulent. Alternatively, the product being identified in the user activity data can be used as a positive factor among multiple factors considered in a risk analysis of the transaction.

If the product is not identified in the user activity data, for example, the risk analysis system 140 provides a risk score to the merchant system 130, for example, indicating that the purchase transaction is may be fraudulent or that the risk analysis system 140 does not have information to support a positive assessment of the transaction. Alternatively, the product not being identified in the user activity data can be used as a negative or neutral factor among multiple factors considered in a risk analysis of the transaction.

Figure 3:
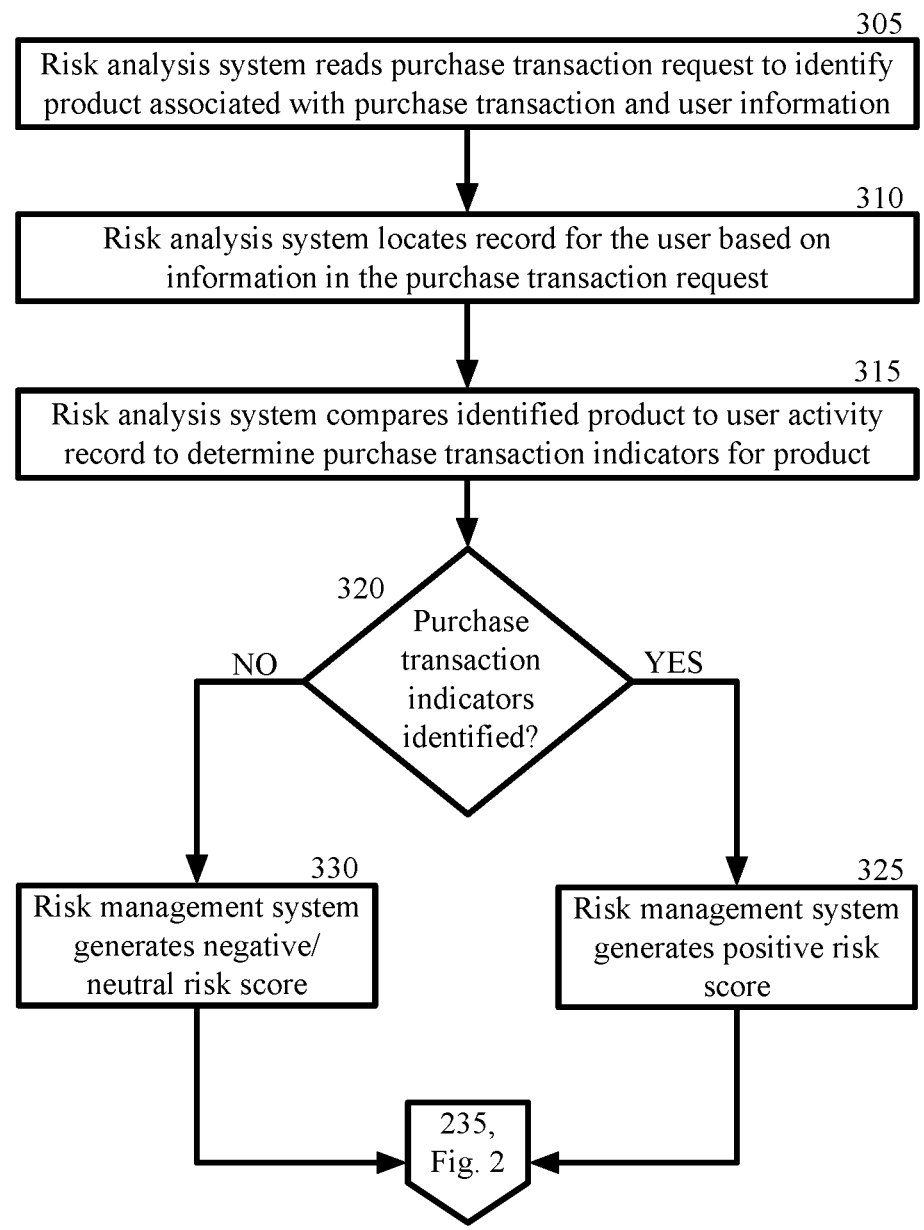
FIG. 3 is a block flow diagram depicting a method for determining a risk score for a purchase transaction, in accordance with certain example embodiments.

FIG. 3 is a block flow diagram depicting a method 230 for determining a risk score for a purchase transaction, in accordance with certain example embodiments, as referenced in block 230 of FIG. 3.

With reference to FIGS. 1 and 2, in block 305 of method 230, the risk analysis system 140 reads the purchase transaction request to identify the product associated with purchase transaction and the user information. For example, if the product associated with the purchase transaction is a television, the risk analysis system 140 determines from the content of the purchase transaction request that the product is a television. Likewise, if the product of the purchase transaction is airfare, the risk analysis system 140 determines from the content of the purchase transaction request that the product is airfare. If the product of the purchase transaction is a travel agent service fee, for example, the risk analysis system 140 determines from the content of the purchase transaction request that the product a travel agent service fee.

In addition to identifying the product that is the subject of the purchase transaction, the risk analysis system 140 reads the purchase transaction request to identify information associated with the user 101. That is, the risk analysis system 140 reads the purchase transaction for information that allows the risk analysis system 140 to identify the record of the user, such as the user account 143, as described herein. For example, a purchaser may present an account number for a user financial account 172 to complete a transaction. If the account number is provided as part of the purchase transaction request, the risk analysis system 140 identifies the account number, for example.

Additionally or alternatively, the risk analysis system 140 may determine other user-identifying information from the purchase transaction request. For example, the purchaser may provider the user's name when attempting to complete a purchase transaction. If the name of the user 101 is included as part of the purchase transaction request, then the risk analysis system 140 determines the name of the user 101 from the purchase transaction request. In certain example embodiments, if the purchase transaction request does not include sufficient information for the risk analysis system 140 to identify either the product or the record of the user 101, then the risk analysis system 140 may seek additional information regarding the purchase transaction request. For example, the risk analysis system 140 may contact the merchant providing the request.

In block 310, the risk analysis system 140 locates the record for the user 101 based on information in the purchase transaction request. That is, based on the user-identifying information from the purchase transaction request, the risk analysis system 140 identifies the record of the user 101 associated with the user activity data. For example, the risk analysis system 140 identifies the user account 143 of the risk analysis system 140. To locate the record of the user 101, the risk analysis system 140, for example, compares the user-identifying information of the purchase transaction request with the information for the user account 143. For example, the risk analysis system 140 compares the financial account number received in the purchase transaction request with the financial account numbers that the user 101 provides to the risk analysis system 140 when establishing the user account 143. The risk analysis system 140 then locates the user account 143 based on a match of the financial account numbers. In certain example embodiments, the risk analysis system 140 may identify the record of the user, such as the user account 143, based on other information provided in the purchase transaction request. For example, as described herein the risk analysis system 140 may identify the name of the user from the purchase transaction request.

In block 315, the risk analysis system 140 compares the identified product to the user activity data to determine purchase transaction indicators for the product. That is, based on the product identified from the purchase transaction request, the risk analysis system 140 scans the user activity data associated with the record of the user 101 for purchase transaction indicators. The purchase transaction indicators comprise any indication, such as an sign, signal, note, confirmation, corroboration, confirmation, or any other evidence, that user 101 might purchase the product that is the subject of the purchase transaction. As such, the purchase transaction indicators comprise any connection or correlation between the product identified in the purchase transaction request and the activity data associated with the record for the user 101.

For example, a user search history for a television would constitute a purchase transaction indicator that the user may purchase the television. Likewise, a user search history for a particular vacation destination—or an email or social network entry about the vacation destination—may serve as an indicator that the user, for example, might purchase airfare (or other fare) to the vacation destination. Similarly, location data showing that the user device (and hence the user) was recently at an electronics store may also serve as an indicator that the user would purchase a television. In another example, location data placing the user 101 at a travel agent may serve as a purchase transaction indication that the user 101 may purchase airfare. As one skilled in the art will appreciate, numerous activities of a user 101 that are included in a user's activity data may service as a purchase transaction indicator of the user 101 for a product that is the subject of a user purchase transaction. For example, the online activity information generated by the online activity of the user 101 may provide one or more purchase transaction indicators for a purchase transaction.

If the risk analysis system 140 identifies one or more purchase transaction indicators for a purchase transaction in the user activity data for a user 101, the method follows the "yes" branch of block 320 to block 325. If the risk analysis system 140 does not identify any purchase transaction indicators for a purchase transaction in the user activity data for a user 101, the method follows the "no" branch of block 320 to block 330. From blocks 325 and 330, the method 230 proceeds to block 235 of FIG. 2.

In block 325, the risk management system 140 generates a positive risk score. That is, if the risk analysis system 140 identifies at least one purchase transaction indicator for a purchase transaction in the user activity data, the risk management system 140 generates a risk score—in response to the purchase transaction request—that informs the recipient of the risk score that the transaction is less likely to be fraudulent. For example, if the risk management system 140 identifies—based on a purchase transaction request for a television—a purchase transaction indicator for the television, such as a user search for the television, the risk management system 140 generates a positive risk score for the purchase transaction request for the television. If the product is identified in the user activity data, the risk analysis system provides a risk score to the merchant indicating that the purchase transaction is not likely to be fraudulent. Alternatively, the product being identified in the user activity can be used as a positive factor among multiple factors considered in a risk analysis of the transaction. In this case, the risk score is the positive factor provided for consideration by the entity receiving the risk score.

In another example, if the purchase transaction concerns an airfare purchase and the user activity data includes a user search for airline tickets, then the risk management system 140 provides a positive risk score for the user's airfare purchase. Likewise, if recent location data places the user device 110 (and hence the user 101) at an electronics store, for example, then the risk management system 140 provides a positive risk score for a user television purchase. In other words, the location data placing the user 101 at the electronics store serves as a purchase transaction indicator for the television. Hence, the risk management system 140 relies on the location data to generate a positive risk score for the television purchase.

In certain example embodiments, the positive risk score may be a qualitative risk score. That is, after identifying a purchase transaction indicator for a purchase transaction, the risk analysis system 140 generates a risk score that indicates a lower risk of fraud, but that does not attempt to quantitate the level of risk. For example, the risk analysis system 140 may generate a "yes" score, a "positive" score, a "low risk" score, or any other qualitative-type score that arises from the risk analysis system 140 identifying one or more purchase transaction indicators in the user activity data. The risk analysis system 140 can then communicate such qualitative risk scores to the entity requesting the score, thus informing the entity that the purchase transaction is (or was) less likely to be fraudulent.

Additionally or alternatively, the risk analysis system 140 generates a quantitative risk score. That is, the risk analysis system 140 associates with the risk score a measure of likelihood that the purchase transaction is (or was) fraudulent. In certain example embodiments, the risk analysis system 140 provide a risk score that is a function of the number of purchase transaction indicators for a particular purchase transaction that the risk analysis system 140 identifies in the user activity data. For example, a single purchase transaction indicator for a particular purchase transaction may result in a low score, whereas the identification of multiple purchase transaction indicators for the purchase transaction results in a high score. A single purchase transaction indicator that a user would purchase a television, for example, may result in a risk score of "1." The identification of two indicators, however—such as a search history for the television and location data placing the user device near an electronics store—may results in a risk score of "5" or "6." The risk score may also be range, for example, such as 1-10, with "1" corresponding to the identification of a single or a few purchase transaction indicators and "10" corresponding to the identification of multiple transaction indicators. In certain example embodiments, the risk score may correspond to the number of purchase transaction indicators that the risk analysis system 140 identifies is in the user activity data. For example, if the risk analysis system 140 identifies 20 purchase transaction indicators, the risk analysis system 140 may generate a risk score of "20."

Additionally or alternatively, in certain example embodiments, the risk analysis system 140 may assign weights to various purchase transaction indicators identified in a user's activity data. That is, in addition or alternatively to being a function of the number of purchase transaction indicators, the risk score may be a function of weighted purchase transaction indicators. The risk analysis system 140, for example, may assign more weight to those purchase transaction indicators that the risk analysis system 140 deems to be more predicative of purchasing the product that is the subject o the purchase transaction. For example, if the purchase transaction involves a television, user emails about a specific television may receive more weight than location data placing the user device near an electronics score. In another example, a user search history for airfare may receive more weight than a user 101 posting non-specific vacation photographs on a social network page. In another example, a user search history for televisions generally may receive less weight than a user search history for a specific television. As those skilled in the art will appreciate, the risk analysis system 140 described herein may determine a number of quantitative risk scores that are a function of the number of purchase transaction indicators and/or the weight assigned to one or more of the purchase transactions.

In block 330, the risk management system 140 generates negative or neutral risk score. That is, if the risk management system 140 does not identify any purchase transaction indicators for a particular purchase transaction in the user activity data, the risk management system 140 generates a risk score—in response to the purchase transaction request—that informs the recipient of the risk score that the transaction might be fraudulent or that the risk management system 140 does not have information to assess whether the transaction is fraudulent. In certain example embodiments, the risk management system 140 generates a negative score, for example, such as a "No" score or "likely fraudulent" score. In certain example embodiments, the risk management system 140 may generate a neutral score, such as a "no score available" or "no indicators identified" score. For example, because the absence of a purchase transaction indicator may not necessarily indicate that a transaction is fraudulent—while the existence of purchase transaction indicators may indicate lower likelihood of fraud—the risk management system 140 may generate a neutral score in the absence of an identified purchase transaction indicator for a purchase transaction. Additionally, an absence of the product being identified in the user activity data can be used as a neutral or negative factor among multiple factors considered in a risk analysis of the transaction. In this case, the risk score is the positive factor provided for consideration by the entity receiving the risk score.

In certain example embodiments, in addition to receiving user activity data from a user 101, the risk analysis system 140 may independently obtain general information that may be useful to the risk analysis functions of the risk management system 140. For example, the risk analysis system 140 may obtain information for specific merchants, online merchants, retailers, online retailers, service providers, online service providers, restaurants, landmarks, buildings, parks, rail stations, airports, ports, sports arenas, or any other location or entities that might be useful to the risk analysis functions of the risk management system 140. The risk analysis system 140 may obtain the information from any source. For example, the risk analysis system 140 may obtain the information from online sources, such as merchant or retailer websites. The risk analysis system 140 may also categorize the information for use in determining a risk score. A restaurant called "John Doe's Steak House," for example, may be hierarchically categorized from a specific category to a more general category. That is, beyond the specific name "John Doe's Steak House," the risk analysis system 140 may categorize the restaurant as a "steak house," a "fine-dining restaurant," a "restaurant," or "food," with the latter category of "food" being the most generic (in this example).

In certain example embodiments, the risk analysis system 140 determines a risk score for a particular user 101 that is a function of both the categorized information and purchase transaction indicators identified in the user activity data. That is, the risk analysis system 140 may weight a purchase transaction indicator based on the category of information to which the identified purchase transaction indicator corresponds. For example, if the risk analysis system 140 receives a purchase transaction request regarding "John Doe's Steak House," an identified purchase transaction indicator—such as a user search for "John Doe's Steak House"—would receive significantly more weight than a user search for "food." Continuing with this same example, a search by the user 101 for "steak house" would receive more weight than a user search for a "restaurant." In another example, the risk analysis system 140 may categorize a television based first on the particular television, and thereafter the "brand name" of the television, "televisions" generally, and then "consumer electronics." A purchase transaction for the particular television may receive the highest weight, with the categories of "brand name," "televisions" generally, and "consumer electronics" respectively receiving less and less weight.

In certain example embodiments, the risk analysis system 140 determines categorized information for use in a risk score determination in response to receiving a purchase transaction request. For example, the risk analysis system 140 may receive a purchase transaction request for "John Doe's Steak House." In response to the purchase transaction request, the risk analysis system 140 may determine that the "John Doe's Steak House" is a steak house, and hence further determine categories of "steak house," "fine-dining restaurant," "restaurant," and "food" for "John Doe's Steak House." The risk analysis system 140 may then, when processing the purchase transaction request for "John Doe's Steak House," correlate an identified purchase transaction indicator to the determined category as described herein. For example, a purchase transaction indicator, such as a user online search for "steak house," may receive more weight than a user online search for the more general category of "food." Likewise, the risk analysis system 140 may receive a purchase transaction request for a particular television. In response to the request, the risk analysis system 140 may determine "brand name," "televisions," and "consumer electronics" categories for the television. The risk analysis system 140 can then identify purchase transaction indicators in the user activity data as described herein, and also weight the identified purchase transaction indicators based on the more specific (or less specific) determined categories. For example, a purchase transaction indicator for the "brand name," such as a search by the user 101 for the "brand name," may receive more weight than a search by the user 101 for "consumer electronics."

Other Example Embodiments

Figure 4:
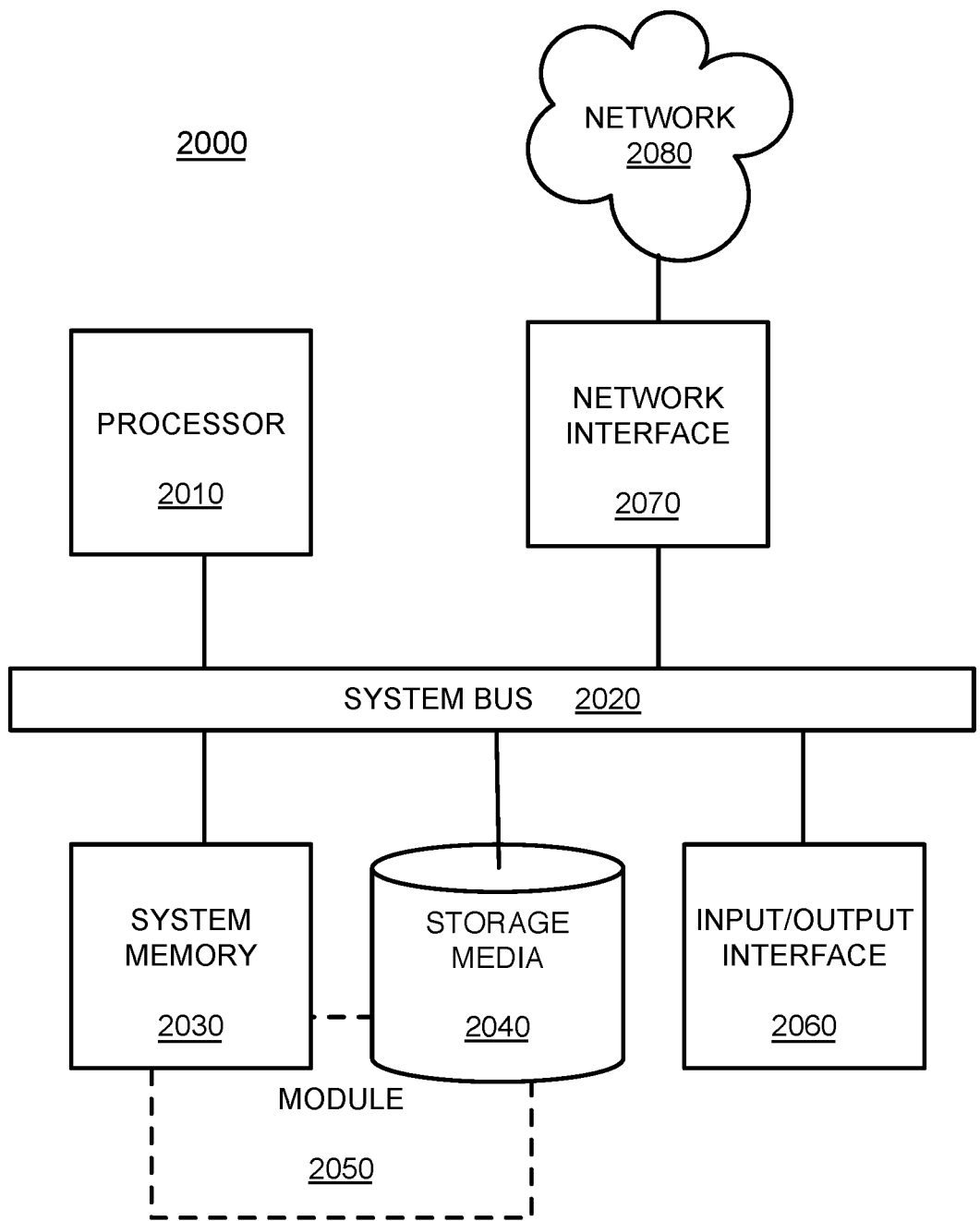
FIG. 4 is a block diagram depicting a computing machine and a module, in accordance with certain example embodiments.

FIG. 4 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain example embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the examples described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to reduce fraud in online transactions by correlating shopping behaviors of users with product identification information associated with products being purchased in the online transactions, comprising:

logging, by one or more computing devices, user activity data, the user activity data comprising one or more elements associated with products and services;

associating, by the one or more computing devices, the user activity data with a record for the user;

receiving, by the one or more computing devices, a request from an online merchant computing system, wherein the request identifies a product for a transaction involving an account of the user and provides information sufficient to identify the record of the user;

comparing, by the one or more computing devices, the one or more elements of the user activity data with one or more features of the product;

determining, by the one or more computing devices, based on the comparison, that one or more elements of the user activity data is a match with of one or more features of the product; and determining, by the one or more computing devices, a risk indicator for the transaction based on the match of the one or more elements of the user activity data to the one or more features of the product, wherein the determined risk indicator is lower based on the presence of one or more matches between the one or more elements of the user activity data and the one or more features of the product, and wherein a lower risk indicator is associated with a transaction that has a lower risk of fraud and a higher risk indicator is associated with a transaction that has a higher risk of fraud.

2. The computer-implemented method of claim 1, wherein the elements of the user activity data comprise a location history of a user computing device and online activity information.

3. The computer-implemented method of claim 1, further comprising:
calculating, by the one or more computing devices, a risk score for the transaction based on the determined risk indicator, the risk score being indicative if the transaction is likely to be fraudulent; and
communicating, by the one or more computing devices, the risk score to the merchant computing system.

4. The computer-implemented method of claim 1, wherein the presence of a greater number of matches results in a lower risk indicator for the purchase transaction.

5. The computer-implemented method of claim 1, wherein the risk indicator is a qualitative risk score or a quantitative risk score.

6. The computer-implemented method of claim 1, wherein a greater number of matches correlates to an increased likelihood that the purchase transaction involving the financial account of the user is a valid transaction.

7. The computer-implemented method of claim 1, wherein the information sufficient to identify the record of the user comprises financial account information of the user.

8. A system to correlate user activity data with transaction information to reduce fraud in online transactions by correlating shopping behaviors of users with product identification information associated with products being purchased in the online transactions, comprising:
a storage device;
a processor communicatively coupled to the storage device, wherein the processor executes application code instructions that are stored in the storage device to cause the system to:
receive user activity data associated with a user, wherein the user activity data comprises one or more elements associated with products and services;
associate the user activity data with a record for the user;
receive a purchase transaction request from a computing system, wherein the purchase transaction request identifies a product for a purchase transaction involving a financial account of the user and provides information sufficient to identify the record of the user;
compare the one or more elements of the user activity data with one or more features of the product;
determine that one or more elements of the user activity data is a match with the one or more features of the product; and
determine a risk indicator for the transaction based on the match of the one or more elements of the user activity data to the one or more features of the product, wherein the determined risk indicator is lower based on the presence of one or more matches between the one or more elements of the user activity data and the one or more features of the product, and wherein a low risk indicator is associated with a transaction that has a low risk of fraud and a high risk indicator is associated with a transaction that has a high risk of fraud.

9. The system of claim 8, wherein the elements of the user activity data comprise a location history of a user computing device and online activity information.

10. The system of claim 8, further comprising application code instructions to:
calculate a risk score for the transaction based on the determined risk indicator, the risk score being indicative if the transaction is likely to be fraudulent; and
communicate the risk score to a computing system.

11. The system of claim 8, wherein the computer system is a merchant computing system or a financial account issuer computing system.

12. The system of claim 8, wherein the presence of a greater number of matches results in a lower risk score for the purchase transaction.

13. The system of claim 8, wherein a greater number of matches correlates to an increased likelihood that the purchase transaction involving the financial account of the user is a valid transaction.

14. The system of claim 8, wherein the information sufficient to identify the record of the user comprises financial account information of the user.

15. A computer program product, comprising:
a non-transitory computer-readable storage device having computer-executable program instructions embodied thereon that when executed by a computer cause the computer to reduce fraud in online transactions by correlating shopping behaviors of users with product identification information associated with products being purchased in the online transactions, the computer-executable program instructions comprising:
computer-executable program instructions to receive user activity data associated with a user, wherein the user activity data comprises one or more elements associated with products and services;
computer-executable program instructions to associate the user activity data with a record for the user;
computer-executable program instructions to receive a purchase transaction request from a merchant computing system, wherein the purchase transaction request identifies a product for a purchase transaction involving a financial account of the user and provides information sufficient to identify the record of the user;

computer-executable program instructions to identify information in the record of the user based on the purchase transaction request;

computer-executable program instructions to compare the one or more elements of the user activity data with one or more features of the product;

computer-executable program instructions to determine that one or more elements of the user activity data matches one or more of the features of the product; and computer-executable program instructions to determine a risk indicator for the purchase transaction based on the match of the one or more elements of the user activity data to the one or more features of the product, wherein the determined risk indicator is lower based on the presence of one or more matches between the one or more elements of the user activity data and the one or more features of the product, and wherein a low risk indicator is associated with a transaction that has a low risk of fraud and a high risk indicator is associated with a transaction that has a high risk of fraud.

16. The computer program product of claim 15, wherein the elements of the user activity data comprise a location history of a user computing device and online activity information.

17. The computer program product of claim 15, further comprising computer-executable program instructions to:
calculate a risk score for the transaction based on the determined risk indicator, the risk score being indicative if the transaction is likely to be fraudulent; and
communicate the risk score to the merchant computing system.

18. The computer program product of claim 15, wherein the presence of a greater number of matches results in a lower risk score for the purchase transaction.

19. The computer program product of claim 15, wherein the presence of a greater number of matches results in a lower risk score for the purchase transaction.

20. The computer program product of claim 15, wherein the information sufficient to identify the record of the user comprises financial account information of the user.

* * * * *